United States Patent
Pagilagan

(10) Patent No.: US 6,960,369 B2
(45) Date of Patent: Nov. 1, 2005

(54) CROSS-LINKABLE NYLON COMPOSITIONS FOR COATING APPLICATIONS, PROCESSES USING SUCH COMPOSITIONS, AND ARTICLES MADE THEREFROM

(75) Inventor: Rolando U. Pagilagan, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/437,765

(22) Filed: May 14, 2003

(65) Prior Publication Data

US 2004/0024142 A1 Feb. 5, 2004

Related U.S. Application Data

(60) Provisional application No. 60/380,378, filed on May 14, 2002.

(51) Int. Cl.$^7$ .............................. D02G 3/00; C08L 61/20; C08L 77/06
(52) U.S. Cl. ....................... 427/288; 428/364; 428/365; 428/375; 525/427; 525/428
(58) Field of Search ................................. 525/427, 428; 427/288; 428/364, 365, 375

(56) References Cited

U.S. PATENT DOCUMENTS

| | | |
|---|---|---|
| 4,323,639 A | 4/1982 | Chiba |
| 4,895,660 A | 1/1990 | Kertner |
| 4,992,515 A | 2/1991 | Ballard |
| 5,688,632 A | 11/1997 | Kashio |
| 5,804,313 A * | 9/1998 | Schell .................. 428/391 |
| 6,114,430 A | 9/2000 | Paulson |

OTHER PUBLICATIONS

Dupont, Elvamide Nylkon Multipolymer Resins, Properties and Uses (Sep. 1977).
Dupont, Elvamide Nylon Multipolymer Resins for Thread Bonding, Oct., 1977.
DuPont, Elvamide Product and Properties Guide, Dec. 1990.
Nylon Plastics Handbook, Hansen/Gardner Publications, Inc., (1995) pp. 283–290.
Encyclopedia of Ppolymer Science & Engineering, vol. 17, pp. 730–784, Second Edition, Joh Wiley & Sons (1989).
Patent Abstracts of Japan, vol. 2000, No. 16, May 8, 2001 JP 2001 019763(Namariichi:KK; Unitika Ltd).
Patent Abstracts of Japan, vol. 2000. No. 19, Jun. 5, 2001, JP 048980, (Namariichi:KK).

* cited by examiner

*Primary Examiner*—Ana Woodward

(57) ABSTRACT

Cross-linkable nylon compositions used as coatings for nylon and polyester substrates are disclosed. These compositions comprise a water-soluble polyamide derived from select polyether diamines and select aliphatic dicarboxylic acids, a water-soluble formaldehyde-derived crosslinking agent, and optionally an acid catalyst. Processes for their application in coating substrates and various coated articles are also described.

12 Claims, No Drawings

CROSS-LINKABLE NYLON COMPOSITIONS FOR COATING APPLICATIONS, PROCESSES USING SUCH COMPOSITIONS, AND ARTICLES MADE THEREFROM

CROSS REFERENCE TO RELATED APPLICATION

This application claims the benefit of U.S. Provisional Application No. 60/380,378, filed May 14, 2002.

FIELD OF THE INVENTION

This invention relates to water-soluble polyamide compositions suitable for coating nylon and polyester substrates. More particularly, this invention relates to such polyamide compositions that further incorporate select cross linking agents thereby rendering them water-insoluble after application. Processes for their use and articles incorporating these compositions are also disclosed.

BACKGROUND OF THE INVENTION

Nylons are well known for their toughness, abrasion resistance, lubricity, and chemical resistance. Any number of polymeric materials may be coated with nylon polymers to enhance their properties accordingly. For example, sewing threads are typically coated with nylon (and lubricants in most cases) to protect them from abrasion during sewing operations. Furthermore, in thread bonding applications such coatings are applied to twisted multi-filament sewing threads in order to prevent fraying and unraveling (untwisting) of the individual filaments. See generally, a December 1990 brochure entitled "Elvamide® Product and Properties Guide", describing their nylon multipolymer resins and available from E.I. DuPont de Nemours & Co., Wilmington, Delaware and Kohan, M. I., "Nylon Plastics Handbook" Hansen/Gardner Publications, Inc. (1995) pages 283–290.

Presently, nylon multi-polymers that are soluble in alcohols are available for coatings applications (see the reference to "Nylon Plastics Handbook" noted above). These types of nylons are sold commercially for a variety of coatings and adhesive applications. Generally these are readily soluble in organic solvents and are generally applied as alcoholic solutions. See for example brochures entitled "Elvamide® Nylon Multipolymer Resins, Properties and Uses" (September 1977), "Elvamide® & Nylon Multipolymer Resins for Thread Bonding" (October 1977), and "Elvamide® Product and Properties Guide" (December 1990) all from E.I. DuPont de Nemours and Company. However, there is an interest in aqueous-based nylon systems for these applications that eliminate or alleviate organic emissions.

To be effective, any viable water-soluble nylon coating system would require a readily available water-soluble nylon and a process for rendering the coating of this material water-insoluble either during or after the coating process. The insolubilization process is important for a number of end-use applications where subsequent exposure to water would occur.

Water-soluble polymers are either natural (biopolymers) or man-made. To be water-soluble these polymers are highly polar in nature. A large number of functional groups are used to impart polarity and, in turn, water-solubility to various polymers. Functional groups such as amines, hydroxyl, sulfonic acids, and carboxylic acids and their salts are commonly used to solubilize polymers. However, it is not uncommon for the reactive functional groups such as acids and amines to react with other acids and bases that they come in contact with during end-use, and this leads to changes in properties such as solubility. For an extensive review of this subject see "Water-Soluble Polymers", Encyclopedia of Polymer Science & Engineering, Volume 17, pages 730–784, Second Edition, John Wiley & Sons (1989).

The patent literature includes various teachings regarding water-soluble nylons. U.S. Pat. No. 4,895,660 describes water-soluble sulfonated aromatic polyamides and polyureas that are cross-linked ionically with multi-valent metals for membranes, coatings, and adhesives. Japanese Patent Application 56-93704 describes a photosensitive composition comprising a water-soluble polyamide containing sodium sulfonate groups, a polymerizable unsaturated compound, and a sensitizer for printing plate applications. Japanese Patent Application 98007903A claims the use of alcohol-water solutions of nylons commonly known as PA66, PA46, PA6, and PA12 with a water-soluble methoxymethylated nylon, and thiocyanate salts in alcohol-water solvent as wiper blade coatings to improve performance and durability of the blades. U.S. Pat. Nos. 4,323,639 and 5,688,632 are both directed to water-soluble copolyamides containing polyether segments of 150 to 1500 molecular weight. These polyether-amide segments are obtained from polyether diamines and an aliphatic dicarboxylic acid. These water-soluble polyamides are used in conjunction with photopolymerizable compound and a photoinitiator for printing plate applications. The Elvamide® (October 1977) brochure and the "Nylon Plastics Handbook" mentioned above describe the ability of thermosetting resins such as epoxy, phenol-formaldehyde, and melamine-formaldehyde to cross-link nylon multi-polymers and improve the adhesion of the coating. The nylon multi-polymer reacts with these thermosetting resins to form thermoset-thermoplastic compositions. U.S. Pat. No. 4,992,515 describes the use of Cymel® 1135 available from Cytek Industries, Inc., a fully alkylated melamine-formaldehyde resin, and strong acid catalyst to crosslink nylon 6/66/69, nylon 6/66/610, and nylon 6/66/612 terpolymers applied from alcohol solutions. Other grades of Cymel® amino formaldehyde crosslinking agents are also available from Cytek.

The need for reduction or elimination of volatile organic compounds has been an objective in industry for a number of years. However, up to now there has been no report of a water-soluble nylon used as coatings and which is subsequently crosslinked with a water-soluble melamine-formaldehyde crosslinking agent to render the coating insoluble in water.

It is an object of the present invention to provide a water-soluble nylon that can be readily applied as a coating to substrates. It is a further object of the present invention to provide such nylon materials that can be rendered insoluble to water after their application. It is another object of the present invention to provide a polyamide coating composition that can be applied using a water solution. This water-soluble nylon is then crosslinked either during the coating process or subsequently thereafter rendering the water-soluble nylon insoluble in water. A feature of the present invention is its utility as a coating useful in a variety of applications including films, tubings, and shaped articles, and of particular interest sewing threads and filaments. Another feature of the present invention is its configuration as an aqueous-based system, thereby reducing organic emissions. An advantage of the present invention is its adaptability as a coating suitable for both nylon and polyester substrates. These and other objects, features and advantages of the present invention will become better understood upon having reference to the description of the invention herein.

SUMMARY OF INVENTION

There is disclosed and claimed herein a coating solution which suitably adheres to substrates of polyamides, polyesters and mixtures thereof, comprising (a) a water-soluble polyamide having a solubility in water at 23 C. of at least 0.5 weight percent and derived from the reaction of adipic acid and ether diamines with a molecular weight of 148 to 396 and represented by the general formulas:

wherein $R_1$ and $R_2$ are either —$CH_2$—$CH_2$— or —$CH_2$—$CH_2$—$CH_2$—;

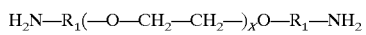

wherein $R_1$ is either —$CH_2$—$CH_2$— or —$CH_2$—$CH_2$—$CH_2$— and X has an average value of 2 to 6; and mixtures thereof;

(b) 1 to 100 weight percent based on the weight of the water-soluble polyamide of a water-soluble crosslinking agent selected from the reaction product of formaldehyde and amine-containing compounds; and (c) 0 to 20 weight percent based on the weight of the cross linking agent of an organic or inorganic acid having a pKa greater than 1.9.

Copolyamides of the above polyamide (a) with other polyamide-forming comonomers can also be used herein. Those of skill in the art will appreciate that the $R_1$'s in the above formula are usually the same, but can be different.

There is also disclosed and claimed herein processes using the above-described compositions as coating solutions. A substrate of polyamide, polyester or mixtures thereof is provided, and to which the coating solution is applied. The water-soluble formaldehyde-derived crosslinking agent is applied in combination with the water soluble polyamide (e.g. as part of the solution). Likewise the optional organic or inorganic acid (incorporated as a catalyst for the crosslinking reaction) is applied in solution with both of the water-soluble polyamide and the crosslinking agent. Altogether the process described herein is effective for rendering the coating essentially water-insoluble either during or subsequent to the coating operation.

The substrates as coated may take the form of any number of articles. These coatings are useful for imparting the well-known desirable properties of nylons to sewing threads, filaments, films, tubings, and other shaped articles.

DETAILED DESCRIPTION OF THE INVENTION

The water-soluble polyamides (a) useful in this invention may be used in conjunction with other nylon forming comonomers, provided these comonomers do not adversely affect the water solubility of the resulting polyamide. These added comonomers may include other polyamide forming comonomers such as polyether diamines, polyether diacids, alkylene diamines, and alkylene dicarboxylic acids. Moreover, other formulations of note include those wherein the above-described water-soluble polyamide is a copolymer with caprolactam and polyamides derived from hexamethylene diamine or 2-methylpentamethylene diamine and adipic acid or mixtures thereof. The solubility in water of these nylons is influenced not only by the amount of the polyetherdiamines and the nature of the dicarboxylic acids but the molecular weight as well. Additives such as heat and UV stabilizers, anti-oxidants, plasticizers, lubricants, and catalyst may be used if desired to enhance the properties of the polymer or aid the polymerization process. Those having skill in the art to which this invention pertains will readily appreciate how much and in what manner these additives may be incorporated.

Useful crosslinking agents (b) are those derived from the reaction of formaldehyde with amine-containing compounds. Examples of these amine compounds are melamine, benzoguanamine, and glycoluril. Various types of crosslinking agents are disclosed in a brochure entitled "High Solids Amino Crosslinking Agents" (September 1994) available from Cytec Industries Inc. These crosslinking agents are prepared by the reaction of the amine functionality with formaldehyde resulting in the replacement of the hydrogen of the amine function by a hydroxymethyl group (—$CH_2OH$). The hydroxymethyl can be reacted with an alcohol to convert the hydroxy function to an alkoxy (—$CH_2OR$). Many classes of these crosslinking agents (b) are possible depending on the extent of reaction and the amine compound used. For example, there are many commercially available types in melamine-formaldehyde crosslinking resins. Partial reaction of the amino functionalities in melamine (Structure 1)

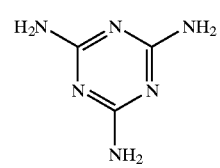

Structure 1 results in (Structure 2)

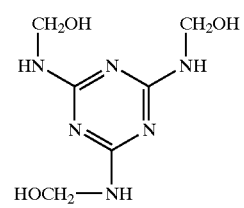

Structure 2 where only some of the hydrogens have been replaced by the hydroxymethyl groups. Alkylation reaction of Structure 2 with an alcohol results in the conversion of the hydroxy group to alkoxy group (Structure 3).

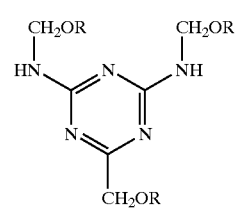

Structure 3

Melamine-formaldehyde resins containing the type of functionality as in Structure 3 are classified as high imino-type resins. The complete replacement reaction of melamine with formaldehyde and subsequent partial alkylation results in Structure 4.

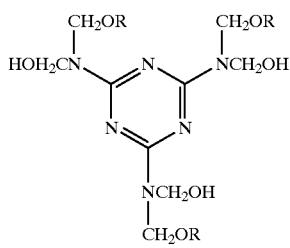

Structure 4

Again resins containing this type of functionality are classified as partially alkylated. If the reaction with alcohol is allowed to reach completion the fully alkylated derivative (Structure 5) is obtained.

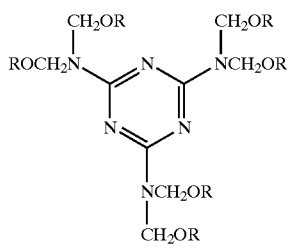

Structure 5

All the above classes of melamine-formaldehyde resins are capable of crosslinking nylons and can be used for the purpose described above. Each class is chemically distinct and has different characteristics and re-activities. Any of these crosslinking agents can be used for the purposes of this invention provided the crosslinking agents have sufficient water solubility. By "sufficient" it is generally understood that the crosslinking agent must be completely solubilized. In general, however, those containing hydroxymethyl groups ($—CH_2OH$) have greater solubility in water.

The crosslinking agents (b) mentioned above have varying reactivities that are temperature dependent. Generally, the reaction is faster at higher temperatures and in the presence of catalysts [the organic or inorganic acids (c)]. A preferred amount of acid(c) is from 0 to 10 weight percent based on the weight or the water-soluble polyamide. For melamine-formaldehyde crosslinking agents with hydroxymethyl and imino functionalities, the preferred catalysts are organic and inorganic acids with pKa greater than 1.9. Examples of these acids are phosphoric acids, citric acid, formic acid, and acetic acid.

EXAMPLES

Preparation of the Nylon Resins

The nylon polymerization was carried out using standard nylon polymerization process that is well known in the art (See Kohan, M. I., "Nylon Plastics Handbook" Hansen/Gardner Publications, Inc. [1995] pages 17–20 & 34–45). As is well known in the art, the stoichiometry of the ingredients was determined and controlled using pH measurements. The molecular weight during polymerization, as indicated by relative viscosity (RV), was controlled by controlling pH, use of atmospheric, nitrogen, or vacuum finishing after pressure reduction. Usually, the molten polymer is quenched in water and then cut into pellets. However, because these nylons are water-soluble the molten polymer is either allowed to cool under ambient conditions or dropped onto a bed of ground dry ice for cooling.

Testing

The relative viscosity in formic acid (RV) of an 8.4% solution was determined at 25 C. using a Brookfield Viscometer.

The solubility in room temperature water (23 C.) at 10% concentration was determined by mixing 10 weight percent of the polymer with 90 weight percent demineralized water and stirring at room temperature. The solution was allowed to sit at room temperature and the solution was observed for any sign of precipitation.

Comparative Example A

In a beaker provided with a stirrer, 300 ml. of demineralized water and 222.0 g of triethyleneglycol diamine ($H_2N—CH_2—CH_2—O—CH_2—CH_2—O—CH_2—CH_2—NH_2$) were mixed and heated to 60–70 C. with stirring. To the mixture was added slowly 345.0 g dodecanedioic acid. An additional 200 ml of de-mineralized water was added. When all the dodecanedioic acid was dissolved the pH was adjusted to 7.15 by addition of 4.1 g of triethyleneglycol diamine (TEGD). The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then subjected to 21.0" of vacuum for 60 minutes. At the end of 60 minutes the batch temperature was 270 C. The autoclave was then pressured with nitrogen and forced out of the autoclave and into a pan. The polymer was allowed to cool to room temperature. The polymer had an RV of 15.7.

Using the same procedure (but with minor variations in temperature and vacuum) as Comparative Example A, Comparative Examples B and C were prepared using the appropriate ingredients. Results are shown below.

| SAMPLE | COMPOSITION | CATALYST | RV | SOLUBILITY |
| --- | --- | --- | --- | --- |
| Comparative Example C | TEGD, 9 | None | 14.9 | Insoluble |
| Comparative Example B | TEGD, 10 | None | 13.3 | Insoluble |
| Comparative Example A | TEGD, 12 | None | 15.7 | Insoluble |

Example 1

In a beaker provided with a stirrer, 300 ml. of de-mineralized water and 444.0 g of TEGD were mixed and heated to 60–70 C. with stirring. To the mixture was added slowly 438.0 g of adipic acid. An additional 100 ml of de-mineralized water was added. When all the adipic acid was dissolved the pH was adjusted to 7.25 by addition of 7.2 g of TEGD. The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at rate such that the batch temperature would continue to increase as it was being concentrated. The polymer was then subjected to 19.5" of vacuum for 60 minutes. At the end of 60 minutes the batch temperature was 270 C. The autoclave was then pressured with nitrogen and forced out of the autoclave and into a pan. The polymer was allowed to cool to room temperature. The polymer had an RV of 12.9.

Example 2

In a beaker provided with a stirrer, 1997.0 g of de-mineralized water and 740.0 g of TEGD were mixed with stirring. To the mixture was added slowly 730.0 g of adipic acid. When all the adipic acid was dissolved 0.37 g of sodium hypophosphite monohydrate (SHP monohydrate) was added. The pH of the salt solution was 7.10. An 830.0 g portion of the salt was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then held at atmospheric conditions for 20 minutes. At the end of 20 minutes the batch temperature was 255 C. The autoclave was then pressured with nitrogen and forced out of the autoclave and into a pan with ground dry ice. The polymer had an RV of 14.0.

Example 3 and Example 4 were prepared under the same procedure as Example 2 with the exception that vacuum was used for the finishing step. The results are shown below.

| SAMPLE | COMPOSITION | CATALYST (1) | RV | SOLUBILITY |
|---|---|---|---|---|
| Example 1 | TEGD, 6 | None | 12.9 | Soluble |
| Example 2 | TEGD, 6 | 210 ppm | 14.0 | Soluble |
| Example 3 | TEGD, 6 | 349 ppm | 20.5 | Soluble |
| Example 4 | TEGD, 6 | 210 ppm | 22.8 | Soluble |

(1) Sodium hypophosphite monohydrate

Examples 1 to 4 and Comparative Examples A, B, and C demonstrate that the incorporation of ether amine segments in the polymer alone is not sufficient to achieve water solubility. The proper selection of the dicarboxylic acid structure is necessary to obtain water soluble nylons

Example 5

In a beaker provided with a stirrer, 300 ml of de-mineralized water and 278.2 g of TEGD were mixed and heated to 60–70 C. with stirring. To the mixture was added slowly 274.5 g of adipic acid. When the adipic acid has dissolved, 269.0 g of caprolactam solution with an 81.86 weight percent concentration was added. The pH was then adjusted to 7.35 by addition of 4.1 g of TEGD. The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then subjected to 22.0" to 22.5" of vacuum for 60 minutes. At the end of 60 minutes the batch temperature was 268 C. The autoclave was then pressured with nitrogen and forced out of the autoclave and into a pan. The polymer was allowed to cool to room temperature. The polymer had an RV of 17.7. The results are shown below.

| SAMPLE | COMPOSITION | MOLE RATIO | CATALYST (1) | RV | SOLUBILITY |
|---|---|---|---|---|---|
| Example 5 | TEGD, 6/6 | 50/50 | None | 17.7 | Soluble |
| Example 6 | TEGD, 6/6 | 50/50 | 349 ppm | 25.6 | Soluble (2) |
| Example 7 | TEGD, 6/6 | 70/30 | None | 15.3 | Soluble |
| Example 8 | TEGD, 6/6 | 80/20 | None | 14.1 | Soluble |
| Comparative Example D | TEGD, 6/6 | 40/60 | None | 19.0 | Insoluble |

(1) Sodium hypophosphite monohydrate
(2) Soluble but went to solution much slower than Example 5

Examples 5, 6, 7, 8, and Comparative Example D illustrate that the ratio of comonomers affect the solubility of the copolymers in water. Example 5 and Example 6 also demonstrate that the RV (molecular weight) of the polymer also affects the rate of solution. The higher molecular weight results in slower dissolution rate.

Examples 9 to 11 and Comparative Examples E, F, G and H

Using the same procedure as in previous examples and controlling RV as previously discussed herein, various copolymers with nylon 66, 46, and 2-methylpetamethylenediamine, 6 were prepared. The results are shown below.

| SAMPLE | COMPOSITION (1) | MOLE RATIO | CATALYST (2) | RV | SOLUBILITY |
|---|---|---|---|---|---|
| Example 9 | TEGD, 6/6, 6 | 90/10 | None | 14.1 | Soluble |
| Comparative Example E | TEGD, 6/6, 6 | 80/20 | None | 15.5 | Insoluble |
| Comparative Example F | TEGD, 6/6, 6 | 70/30 | 152 ppm | 16.5 | Insoluble |
| Example 10 | TEGD, 6/2 MPMD, 6 | 70/30 | None | 15.1 | Soluble |
| Comparative Example G | TEGD, 6/2 MPMD, 6 | 65/35 | None | 17.7 | Insoluble |
| Example 11 | TEGD, 6/4, 6 | 70/30 | None | 9.4 | Soluble |
| Comparative Example H | TEGD, 6/4, 6 | 50/50 | None | 10.5 | Insoluble |

(1) 2MPMD stands for 2-methylpentamethylenediamine
(2) Sodium hypophosphite monohydrate Examples 9, 10, 11, and Comparative Examples E, F, G, and H illustrate again that the solubility in water of copolymers is dependent on the type and amount of comonomer used.

Example 12

In a beaker provided with a stirrer, 500 ml of demineralized water and 264.0 g of 1,2-bis(gamma-aminopropoxy) ethane ($H_2N$—$CH_2$—$CH_2$—$CH_2$—O—$CH_2$—$CH_2$—O—$CH_2$—$CH_2$—$CH_2$—$NH_2$) were mixed and heated to 60–70 C. with stirring. To the mixture was added slowly 219.0 g of adipic acid. When the adipic acid has dissolved the pH was adjusted to 7.12 by adding 26.0 g of 1,2-bis(gamma-aminopropoxy) ethane (BGAE) and 5.0 g of adipic acid. Those having skill in the art will readily appreciate that different grades of BGAE (and as described later, POE-DPA 220) are available, and these have differing levels of monoamines and triamines associated with them. However these byproducts have minor effects in adjusting the pH level so that the pH of interest is readily attained. This may have an effect on the polymerization process, and some adjustments to this process may be necessary to achieve the desirable molecular weight, again as is well appreciated by the person of skill. The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then subjected to 21–22" of vacuum for 60 minutes. At the end of 60 minutes the batch temperature was 258 C. The autoclave was then pressured with nitrogen and forced out of the autoclave and into a pan. The polymer was allowed to cool to room temperature. The polymer had an RV of 7.7.

Example 13

In a beaker provided with a stirrer, 500 ml of de-mineralized water, 246.4 g of BGAE, and 82.0 g of caprolactam solution with an 82.68 weight percent concentration were mixed and heated to 60–70 C. with stirring. To the mixture was added slowly 204.4 g of adipic acid. When the adipic acid has dissolved the pH was adjusted to 7.09 by adding 19.5 g of BGAE. The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then subjected to 21" of vacuum for 60 minutes. At the end of 60 minutes the batch temperature was 264 C. The autoclave was then pressured with nitrogen and forced out of the autoclave and into a pan. The polymer was allowed to cool to room temperature. The polymer had an RV of 8.7.

Comparative Example I

In a beaker provided with a stirrer, 500 ml of de-mineralized water, 211.2 g of BGAE, and 164.0 g of caprolactam solution with an 82.68 weight percent concentration were mixed and heated to 60–70 C. with stirring. To the mixture was added slowly 175.2 g of adipic acid. When the adipic acid has dissolved the pH was adjusted to 7.15 by adding 12.0 g of BGAE. The solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then subjected to 18–19" of vacuum for 60 minutes. At the end of 60 minutes the batch temperature was 264 C. The autoclave was then pressured with nitrogen and forced out of the autoclave and into a pan. The polymer was allowed to cool to room temperature. The polymer had an RV of 10.7. The results are shown below.

| SAMPLE | COMPOSITION (1) | MOLE RATIO | RV | SOLUBILITY |
|---|---|---|---|---|
| Example 12 | BGAE, 6 | | 7.7 | Soluble |
| Example 13 | BGAE, 6/6 | 70/30 | 8.7 | Soluble |
| Comparative Example I | BGAE, 6/6 | 50/50 | 10.7 | Insoluble |

(1) BGAE is an acronym for 1,2-bis(gamma-aminopropoxy)ethane

Examples 12, 13, and Comparative Example I show that replacement of TEGD with BGAE also affords a water-soluble polyamide. Furthermore, copolymers of BGAE,6 behaves similarly with the copolymers of TEGD,6.

Example 14

In a beaker provided with a stirrer, 300 ml of de-mineralized water and 176.0 g of POE-DPA220 were mixed and heated to 60–70 C. with stirring. This diprimary amine has the following structure ($H_2N-CH_2-CH_2-CH_2$-[polyoxyethylene]-$CH_2-CH_2-CH_2-NH_2$) where the polyoxyethylene unit is ($O-CH_2-CH_2-O-CH_2-CH_2-O$) and has a molecular weight of 220. To the mixture was added slowly 116.8 g of adipic acid. The pH of the solution was 6.99. To the solution was then added 0.074 g of sodium hypophosphite monohydrate. The salt solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then held at atmospheric pressure for 20 minutes. At the end of 20 minutes the batch temperature was 249 C. The autoclave was then pressured with nitrogen and forced out of the autoclave and into a pan of dry ice. The polymer had an RV of 7.8 and was soluble in water at room temperature.

Comparative Example J

In a beaker provided with a stirrer, 200 ml of de-mineralized water and 88.0 g of POE-DPA220 were mixed and heated to 60-70 C. with stirring. To the mixture was added slowly 58.4 g of adipic acid. The pH of the solution was adjusted to 6.72 by addition of 5.0 g of POE-DPA220. To the solution were added 117.6 g of a caprolactam solution with a concentration of 74.69 weight percent, 186.8 g of nylon 6,6 salt with a concentration of 31.35 weight percent, and 0.88 g of sodium hypophosphite monohydrate. The salt solution was then introduced into a 3,785 ml autoclave where the solution was heated slowly until the pressure in the autoclave reached 250 psig. At this point, steam was slowly vented while heating was continued. When the batch temperature reached 225 C., the steam venting was increased so as to lower the pressure to atmospheric pressure in 45 minutes but at a rate such that the batch temperature would continue to increase as it was being concentrated. The polymer was then held at atmospheric pressure for 18 minutes. At the end of 18 minutes the batch temperature was 260 C. The autoclave was then pressured with nitrogen and forced out of the autoclave into a pan of dry ice. The polymer had an RV of 12.5.

Using the same procedure as Comparative Example J and controlling RV as previously discussed herein, Comparative Examples K and L were prepared using POE-DPA514 (molecular weight of 514) and POE-DPA1114 (molecular weight of 1114). The results are shown below.

| SAMPLE | COMPO-SITION (1) | SALT WT. RATIO | CATA-LYST | RV | SOLU-BILITY |
|---|---|---|---|---|---|
| Comparative Example J | POE-DPA22O, 6/6, 6/6 | 50/20/30 | 0.30 wt. % | 12.5 | Insoluble |
| Comparative Example K | POE-DPA514, 6/6, 6/6 | 50/20/30 | 0.30 wt. % | 15.9 | Insoluble |
| Comparative Example L | POE-DPA1114, 6/6, 6/6 | 50/20/30 | 0.29 wt. % | 16.4 | Insoluble |

Comparative Examples J, K, and L are polymers containing polyether amines and are described in U.S. Pat. Nos. 4,323,639 and 5,688,632 as water-soluble. These comparative examples show that the water-soluble nylon described in the U.S. Pat. Nos. 4,323,639 and 5,688,632 are not water soluble and are not useful for the purposes of this invention.

Thread Coating Procedure

The thread coating was conducted in a laboratory coating unit similar to the one described in the DuPont brochure relating to Elvamide® (October 1977) and the "Nylon Plastics Handbook". The drying and fusing sections are heated with hot nitrogen passed through electrical tube heaters provided with controllers to allow independent temperature control of the two sections. In a typical coating experiment the thread is passed between cheesecloth saturated with the coating solution by continuously dripping the coating solution onto the cloth from a dropping funnel. The residence time of the thread in the drying and fusion sections are controlled by the take up speed of the spool motor.

The amount of coating on the thread is calculated by comparing the weight of a 90-inch sample of the uncoated thread to the weight of an equal length of the coated thread after drying both at 100 C. in vacuum for 24–48 hours. The amount of crosslinked coating on the thread (amount of coating insoluble in water) was determined by subsequently soaking both the dried uncoated and coated threads in demineralized water for 24 hours. The thread samples were then dried for 24–48 hours at 100 C. under vacuum. The amount of coating not extracted was then calculated by comparing the weights of the coated and uncoated threads.

Example 15

A 15.0 weight percent solution of a 50/50 TEGD,6/6 copolymer with an RV of 15.2 was prepared at room temperature by mixing 30.0 g of the polyamide and 163.4 g of demineralized water. To the solution were added 6.0 g of Cymel® 385 (3.0 weight percent based on the total weight of the solution) and 0.6 g of acetic acid (0.3 weight percent based on the total weight of the solution). This solution was used to coat 210 denier, 3-ply white and black nylon threads, and 220-denier, 3-ply black and white polyester threads. The amount of coating on the thread after the coating process and after subsequent extraction with water are shown in the table below.

| TEMP (C.) | TIME (sec) | THREAD TYPE | WT. % COATING | WT. % COATING AFTER EXTRACTION |
|---|---|---|---|---|
| 80/120 | 6/6 | White Nylon | 5.68 | 4.61 |
|  | 10/10 | White Nylon | 4.29 | 5.82 |
| 120/170 | 6/6 | White Nylon | 6.23 | 2.85 |
|  | 10/10 | White Nylon | 5.92 | 2.73 |
| 80/120 | 6/6 | Black Nylon | 3.48 | 2.28 |
|  | 10/10 | Black Nylon | 5.10 | 3.48 |
| 120/170 | 6/6 | Black Nylon | 10.68 | 6.77 |
|  | 10/10 | Black Nylon | 9.00 | 5.22 |
| 80/120 | 6/6 | White Polyester | 2.26 | 1.13 |
|  | 10/10 | White Polyester | 1.98 | 0.73 |
| 120/170 | 6/6 | White Polyester | 3.74 | 1.80 |
|  | 10/10 | White Polyester | 3.23 | 1.13 |
| 80/120 | 6/6 | Black Polyester | 5.90 | 5.82 |
|  | 10/10 | Black Polyester | 5.16 | 4.01 |
| 120/170 | 6/6 | Black Polyester | 10.95 | 8.41 |
|  | 10/10 | Black Polyester | 8.97 | 6.95 |

The results above show that the coatings on the thread are substantially retained even after extraction with water. This is apparent on comparing the weight percent coating data after coating and after extraction. (In one case the value measured showed an increase in weight percent, and this is likely attributed to experimental error. In any event the overall trend clearly show major fractions of the coatings became insoluble in water.) These data are indicative that the crosslinking reaction has occurred.

It will be readily apparent that any number of variations and modifications to the subject matter disclosed herein can be made, and are contemplated as within the scope and purview of the invention herein.

What is claimed is:

1. Coating solutions which suitably adhere to substrates of polyamides, polyesters and mixtures thereof, comprising:
   (a) a water-soluble polyamide copolymer having a solubility in water at 23 C of at least 0.5 weight percent and derived from the reaction of adipic acid and ether diamines with caprolactam and, optionally, one or more alkylene diamines, wherein the ether diamines have a molecular weight of 148 to 396 and are represented by the formulas:

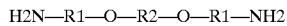
   H2N—R1—O—R2—O—R1—NH2 wherein R1 and R2 are either —CH2—CH2— or —CH2—CH2—CH2—; and

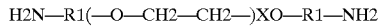
   H2N—R1(—O—CH2—CH2—)XO—R1—NH2 wherein R1 is either —CH2—CH2— or —CH2—CH2—CH— and
   X has an average value of 2 to 6; and mixtures thereof;
   (b) 1 to 100 weight percent based on the weight of the water-soluble polyamide of a water-soluble crosslinking agent selected from the reaction product of formaldehyde and amine-containing compounds; and
   (c) 0 to 20 weight percent based on the weight of the crosslinking agent of an organic or inorganic acid having a pKa greater than 1.9.

2. The coating solution of claim 1 wherein said water-soluble polyamide (a) is a copolymer derived from the reaction of adipic acid and ether diamines with a molecular weight of 148 to 396 and represented by the formulas H2N—R1—O—R2—O—R1—NH2 wherein R1 and R2 are either —CH2—CH2— or —CH2—CH2—CH2— and H2N—R1(—O—CH2—CH2—)XO—R1—NH2 wherein (—O—CH2—CH2—) X is a polyoxyethylene segment and X has an average value of 2 to 6 with one or more alkylene diamines.

3. The process of claim 2 wherein the alkylene diamines are selected from hexamethylene diamine and/or 2-methylpentamethylene diamine.

4. The coating solution of claim 1 wherein said water-soluble polyamide (a) is a copolymer derived from the reaction of ether diamines with the formulas of H2N—R1—O—R2—O—R1—NH2 where R1 and R2 are either —CH2—CH2— or —CH2—CH2—CH2— and H2N—R1(—O—CH2—CH2—)XO—R1—NH2 wherein (—O—CH2—CH2—)X is a polyoxyethylene segment and X has an average value of 2 to 6 and the adipic acid with caprolactam.

5. The coating solution of claim 1 wherein said amine-containing compound in said crosslinking agent (b) is selected from the group consisting of melamine, benzoguanamine, glycoluril, and mixtures thereof.

6. The coating solution of claim 1 wherein said acid (c) is selected from the group consisting of phosphoric acid, citric acid, formic acid, and acetic acid.

7. The coating solution of claim 1 wherein said acid (c) is present in an amount of from 0 to 10 weight percent based on the weight of the cross-linking agent.

8. Shaped structures of nylon or polyester to which the coating solution of claim 1 has been applied.

9. The shaped structure of claim 8 consisting of a thread.

10. The process of claim 1 wherein the alkylene diamines are selected from hexamethylene diamine and/or 2-methylpentamethylene diamine.

11. A process for coating substrates of nylon, polyester or mixtures thereof with water-soluble nylon and subsequently insolubilizing the water-soluble nylon disposed thereon, comprising:

(i) Providing a substrate comprising nylon, polyester or mixtures thereof;

(ii) Coating said substrate with a water-soluble polyamide having a solubility in water at 23 C of at least 0.5 weight percent and derived from the reaction of adipic acid and ether diamines with caprolactam and, optionally, one or more alkylene diamines, wherein the ether diamines have a molecular weight of 148 to 396 and represented by the formulas:

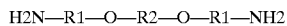

wherein R1 and R2 are either —CH2—CH2— or —CH2—CH2—CH2—; and

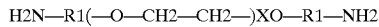

wherein R1 is either —CH2—CH2— or —CH2—CH2—CH2— and

X has an average value of 2 to 6; and mixtures thereof;

(iii) coating said substrate in solution with the water-soluble polyamide in (ii) above with 1 to 100 weight percent based on the weight of the water-soluble polyamide of a water-soluble crosslinking agent selected from the reaction product of formaldehyde and amine-containing compounds; and (iv) optionally coating said substrate in solution with the water-soluble polyamide in (ii) above and the crosslinking agent in (iii) above with 0 to 20 weight percent based on the weight of the cross linking agent of an organic or inorganic acid having a pKa greater than 1.9.

12. The process of claim 11 wherein substrate is a thread.

* * * * *